United States Patent
Reep et al.

(10) Patent No.: US 6,913,053 B2
(45) Date of Patent: Jul. 5, 2005

(54) THREE PLY LAYER TURN-UP PNEUMATIC TIRE

(75) Inventors: David M. Reep, Copley, OH (US); Ronald I. Clunk, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 345 days.

(21) Appl. No.: 10/154,151

(22) Filed: May 22, 2002

(65) Prior Publication Data

US 2003/0217801 A1 Nov. 27, 2003

(51) Int. Cl.[7] ..................... B60C 15/00; B29D 30/30; B29D 30/32
(52) U.S. Cl. ..................... 152/554; 156/132; 156/133
(58) Field of Search ................. 152/552, 554, 152/559, 560; 156/133, 132

(56) References Cited

U.S. PATENT DOCUMENTS

| | | | |
|---|---|---|---|
| 1,280,808 A | 10/1918 | Morgan | |
| 2,317,912 A | 4/1943 | Howe | |
| 2,628,652 A | * 2/1953 | Orr | ........... 152/559 X |
| 2,874,747 A | 2/1959 | Woodall | |
| 3,068,926 A | 12/1962 | Jacob et al. | |
| 3,245,454 A | 4/1966 | Lewis | |
| 3,253,636 A | 5/1966 | Travers | |
| 3,392,773 A | 7/1968 | Warren et al. | |
| 3,464,477 A | 9/1969 | Verdier | |
| 3,498,355 A | 3/1970 | Sperberg | |
| 3,548,912 A | 12/1970 | Rye et al. | |
| 3,709,276 A | 1/1973 | Montague | |
| 4,257,469 A | 3/1981 | Uemura | |
| 4,265,292 A | 5/1981 | Inoue | |
| 4,349,062 A | 9/1982 | Tsurunaga et al. | |
| 4,366,851 A | 1/1983 | Makino et al. | |
| 4,434,831 A | 3/1984 | Uemura | |
| 4,627,479 A | * 12/1986 | Shurman et al. | ........ 152/554 X |
| 4,726,408 A | 2/1988 | Alie et al. | |
| 4,770,222 A | 9/1988 | Mezzanotte | |
| 5,379,820 A | 1/1995 | Cesar et al. | |
| 5,730,815 A | 3/1998 | Sakamoto et al. | |
| 5,871,600 A | 2/1999 | Oare et al. | |
| 6,527,025 B1 | * 3/2003 | Minami | .................. 152/554 X |

FOREIGN PATENT DOCUMENTS

| | | | |
|---|---|---|---|
| EP | 0 819 553 A2 | * | 1/1998 |
| EP | 0 985 556 A2 | * | 3/2000 |

* cited by examiner

Primary Examiner—Andrienne C. Johnstone
(74) Attorney, Agent, or Firm—Michael Sand

(57) ABSTRACT

A pneumatic tire has a tread portion, a pair of axially spaced bead areas and a pair of sidewalls. A body ply carcass extends axially between the bead areas and contains three body ply layers which turn-up about the bead areas from inside to outside. Two of the body ply layers are of equal axial lengths with the third body ply layer being considerably less or greater than the other two layers. The highest turn-up end of at least one of the body ply layers has a height of between 42% and 55% of the tire section height.

20 Claims, 4 Drawing Sheets

THREE PLY LAYER TURN-UP PNEUMATIC TIRE

BACKGROUND OF THE INVENTION

1. Technical Field

The invention relates to pneumatic tire, and in particular to radial ply tires primarily for use with passenger and light truck vehicles. More particularly, the invention relates to such a pneumatic tire having a body ply carcass formed of at least three ply layers which turn-up about the bead area to a specific height with respect to the tire section height with two of the body ply layers having equal axial lengths.

2. Background Information

One of the main elements of a pneumatic radial ply tire construction is the body carcass which generally includes one or more body plies or ply layers formed of various textile fibers calendered within a skim coat of an elastomeric material. These body ply layers extend axially across the tire from one bead area to the other throughout the sidewall and under the tread area with the terminal ends of the body ply layers being turned-up about the beads either from the inside to the outside or visa versa and terminating at various locations along the sidewall of the tire. These body ply layers provide strength and stiffening to the sidewalls, especially during low inflation performance.

Many pneumatic tire constructions use a three body ply arrangement which utilizes three fully bead-tied-in-body plies wherein two of the ply layers are fully bead-tied-in with the remaining ply being a floating ply, that is, having its inner end not fully wrapped around the bead core. Although this ply layer arrangement has proven satisfactory, it is believed that the wrap around tie-in feature of three ply layers makes for a stronger tire construction than that of the prior three ply constructions wherein, one of the plies is not fully wrapped around the bead core.

Other tire constructions have been developed in which three body plies are wrapped around the bead core, such as shown in U.S. Pat. No. 4,366,851. However, in this construction the three body ply layers are of different lengths which increases the cost of tire manufacture by requiring an additional ply length which must be manufactured, stored and transported, as well as modifications to the tire building machines which must apply the three different axial lengths of the body ply layers to the tire building drum.

Thus the need exists for an improved pneumatic tire construction which uses at least three body ply layers which are turned-up about the bead area wherein at least two of the ply layers are of the same axial length to reduce manufacturing costs associated with the building of such a three body ply pneumatic tire.

BRIEF SUMMARY OF THE INVENTION

The present invention provides for a pneumatic tire having a body ply carcass containing at least three body ply layers with turn-up ends extending about the bead area from the inside to the outside which provides for a structurally strong tire, especially when operating at low inflation pressures, and which reduces manufacturing costs by forming two of the body ply layers with the same axial length.

Another feature of the invention is to provide such a pneumatic tire wherein the turn-up end of the intermediate layer has a high turn-up of generally between 42% and 55% of the tire section height, while the inner and outer ply layers have turn-ups generally between 1 inch±⅜ inch around the bead area.

Still another aspect of the invention is to provide both the inner and outer body ply layers with a high turn-up of between 42% and 55% of the tire section height with the turn-up end of the intermediate layer having a turn-up height of approximately ⅝ inch. Likewise, the body ply layer or layers for the low turn-up cord will have an axial length of between 75% and 85% of the axial length of the body ply layer or layers providing the high turn-up cord.

A further feature of the invention is that the building of the three body ply layer turn-up of the present invention requires no expensive modifications to the usual tire assembly method since only two axial lengths of body ply layers are required whereas a usual three body ply layer tire carcass uses three different lengths, two for the turn-up end ply layers and the third for the floating turn-up layer.

The foregoing advantages, construction and operation of the present invention and method steps will become more readily apparent from the following description and accompanying drawings.

DETAILED DESCRIPTION OF THE INVENTION

Figure 1:
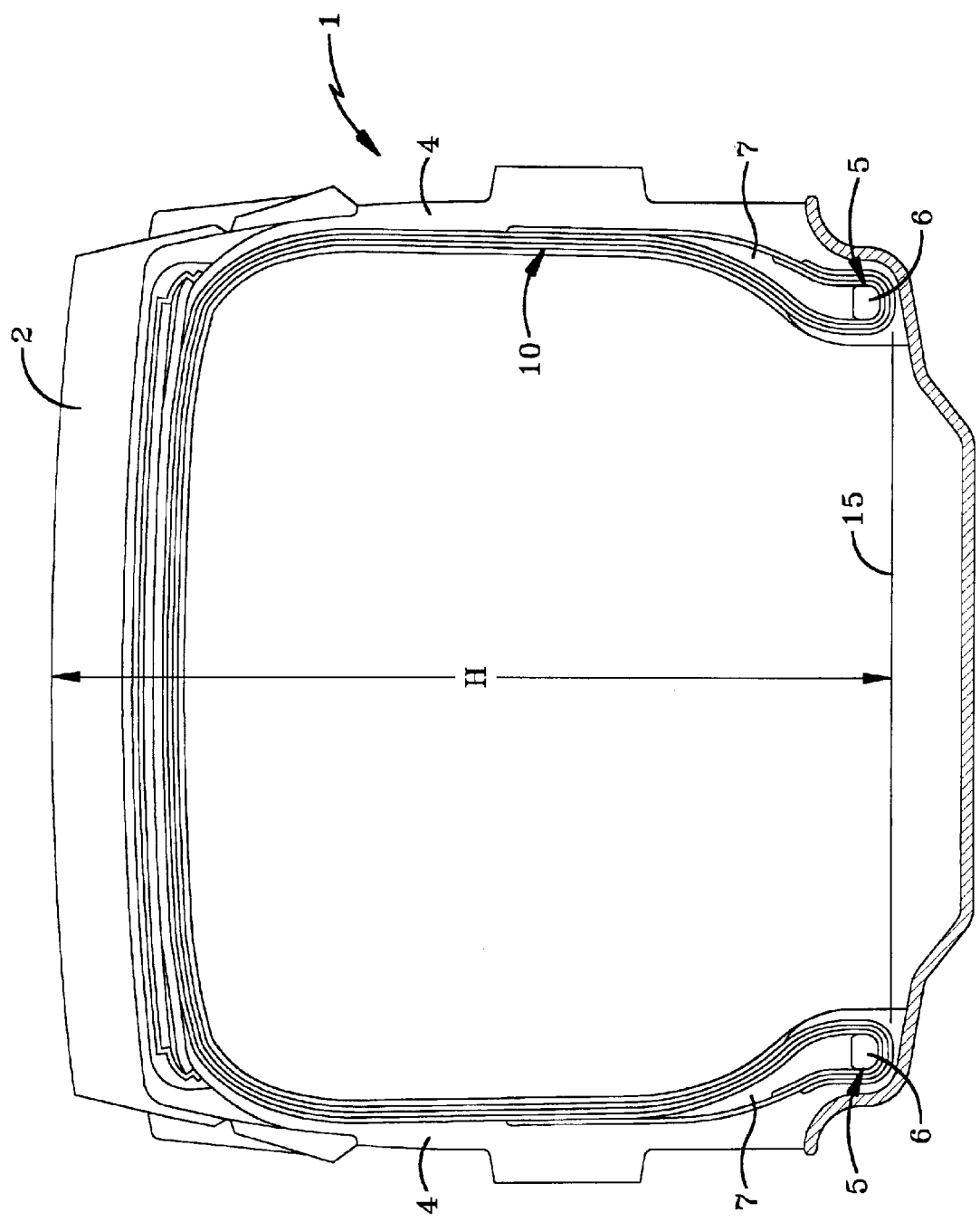
FIG. 1 is a cross sectional view of a pneumatic tire having the improved three body ply turn-up construction.

The improved tire construction of the present invention is shown in diagrammatic section in FIG. 1 and is indicated generally at 1. Tire 1 includes a tread portion 2, a pair of sidewalls 4 which terminate in a pair of axially spaced bead areas which are indicated generally at 5, which include an annular bead ring 6 and a bead filler 7.

In accordance with one of the main features of the invention, an improved body ply carcass indicated generally at 10, extends axially from one bead area to the other bead area through the sidewalls and beneath tread of the tire. A first embodiment of the body ply carcass is shown particularly in FIGS. 1–3 and includes three ply layers indicated in FIGS. 2 and 3 at 11, 12 and 13, hereinafter referred to as inner layer 11, intermediate layer 12 and outer layer 13, shown in greater detail in FIG. 2.

Figure 2:
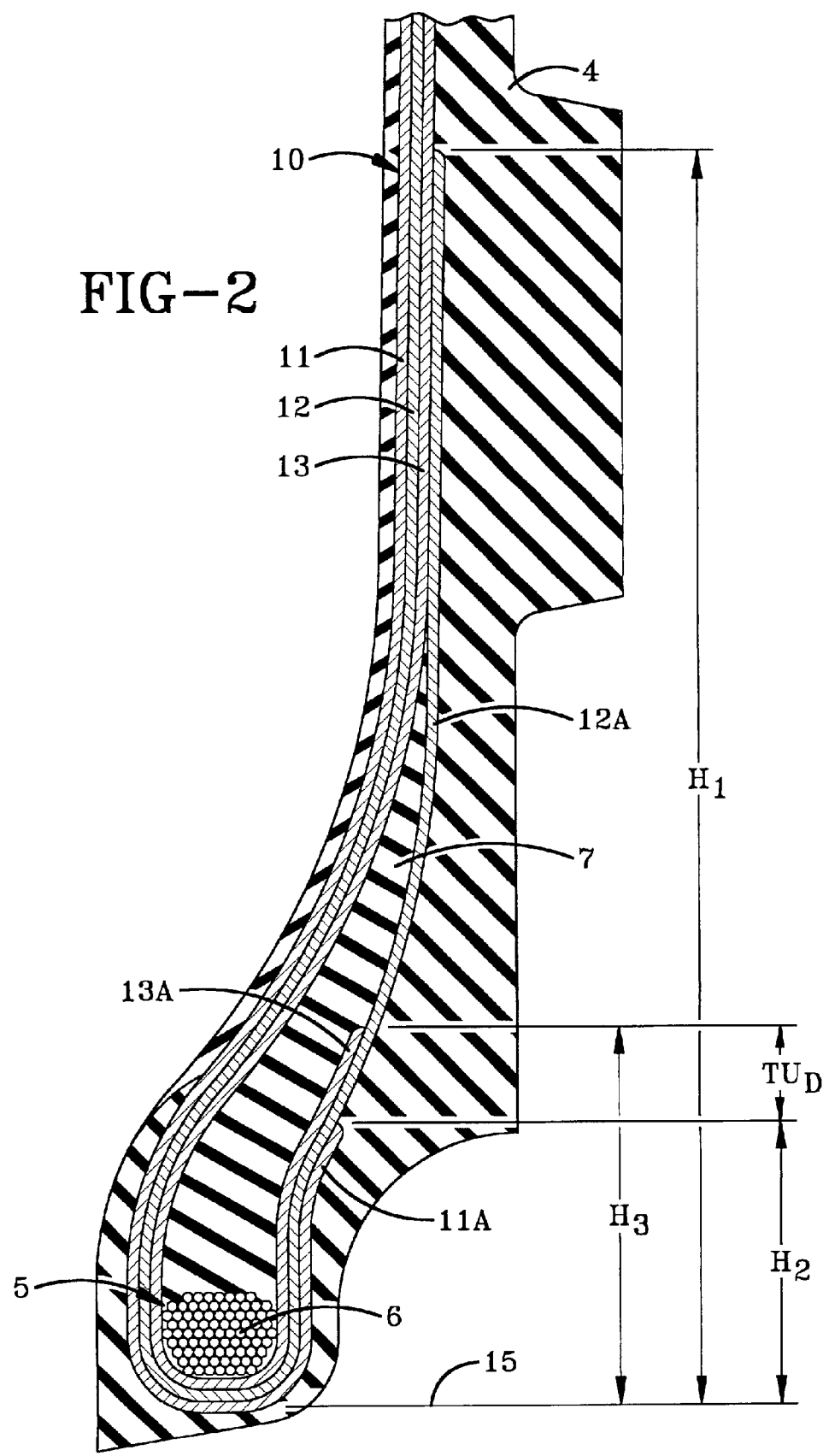
FIG. 2 is a greatly enlarged fragmentary sectional view showing the three body ply turn-up around one of the bead area.

The three body ply layers 11, 12 and 13 are turned-up about bead rings 6 from the inside of the tire to the outside and terminate in turn-up ends 11A, 12A and 13A respectively. The configuration shown in FIG. 2 is referred to as a low-high-low turn-up wherein inner and outer layers 11 and 13 have shorter turn-up ends 11A and 13A, then does intermediate layer 12 which has the greater turn-up end 12A. Turn-up end 12A extends considerably beyond turn-up ends 11A and 13A and upwardly along sidewall 4.

In order to achieve the most satisfactory results, high turn-up end 12A will terminate approximately between 42% and 55% of the tire section height H as designated in FIG. 1, with the preferred height being approximately 45% of the tire section height. This turn-up height is indicated in FIG. 2 as $H_1$. These measurements are taken off of a tire section height reference line 15, which location is used in the tire industry for designating and measuring the tire section height. The location of high turn-up end 12A in this area has been found to provide long term tire durability.

The lower turn-up ends 11A and 13A have heights of $H_2$ and $H_3$ respectively, and remain relatively close to the bead area 5. Lower turn-up ends 11A and 13A will lie adjacent the bead flange area of the tire and rim interface to provide reinforcement for this area thus insuring a tight-fitting engagement between the tire and rim. In this low-high-low embodiment of FIGS. 1 and 2, ends 11A and 13A will have a turn-up height of $H_2$ and $H_3$, respectively, of between 1 inch±⅜ inch. The difference between $H_2$ and $H_3$ is designated as $TU_D$ and will be approximately 3/10 of an inch. This difference is due to the longer radius of curvature of inner body ply layer 11 (as it extends about bead ring 6) than the tighter radius of curvature of outer body ply layer 13, as the axial lengths of body plies 11 and 13 are equal. The high turn-up end 12A is therefore higher than both of the lower turn-up ends 11A and 13A by greater than approximately 3/10 of an inch.

Figure 3:
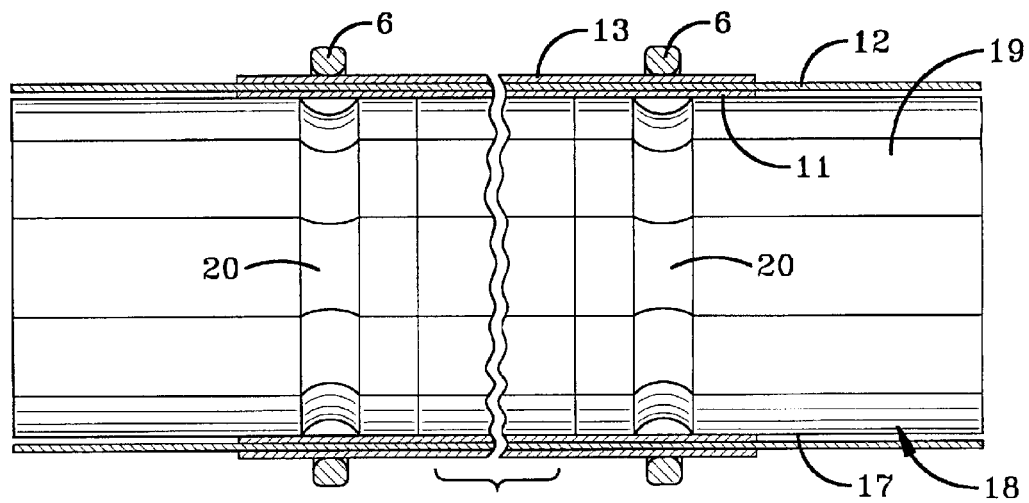
FIG. 3 is a fragmentary diagrammatic sectional view showing the three body ply layers placed on a tire building drum during construction of the tire as shown in FIGS. 1 and 2.

The method of producing the three body ply low-high-low end turn-up configuration of FIGS. 1 and 2 is shown diagrammatically in FIG. 3. Body ply layers 11, 12 and 13 are placed along an outer smooth cylindrical surface 17 of a usual radially expandable tire building drum indicated generally at 18. Drum 18 preferably includes a plurality of radially outwardly extending segments 19. As shown in FIG. 3, inner body ply layer 11 is applied to the drum surface followed by the intermediate body ply layer 12 over which then is laid outer body ply layer 13. Due to the axial lengths of inner and outer body ply layers 11 and 13 being equal, the same delivery system and control mechanisms are utilized for both layers. Differing axial lengths of body ply layers 11 and 13 would require considerable modification to the drum delivery system and additional expense for laying up three different axial length body plies. Bead rings 6 are then placed in position aligned with bead grooves 20 which are formed in the drum. The body ply ends are then turned up (not shown) to form the three ply layer carcass 10 having a generally toroidal shape as shown in FIG. 1.

It is readily understood that various other components, such as gum abrasion strips, hard rubber bead reinforcement strips adjacent the bead area, as well as other reinforcement strips regularly used in the shoulder, sidewalls and bead areas of the tire will be used in forming a usual pneumatic tire having the three body ply turn-up ends.

Figure 4:
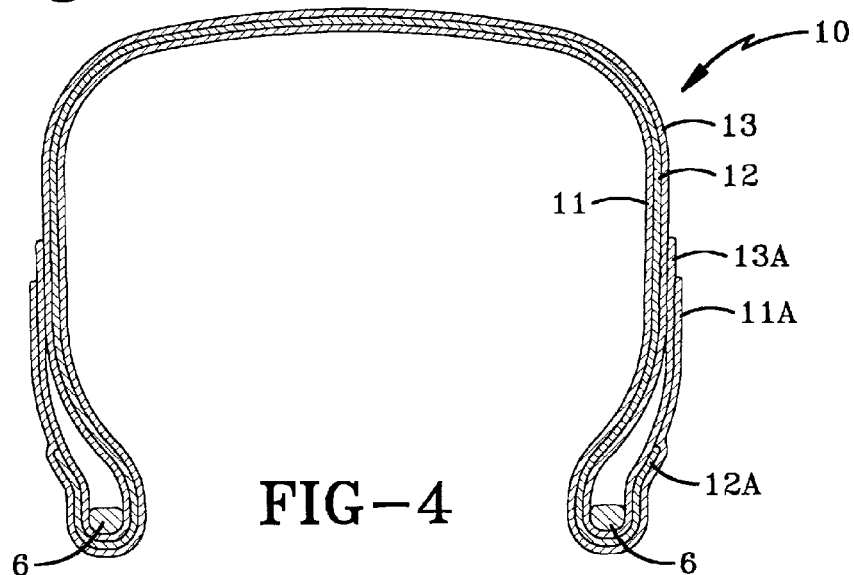
FIG. 4 is a diagrammatic sectional view of a second embodiment of the three body ply tire carcass before placement within the tire.
Figure 6:
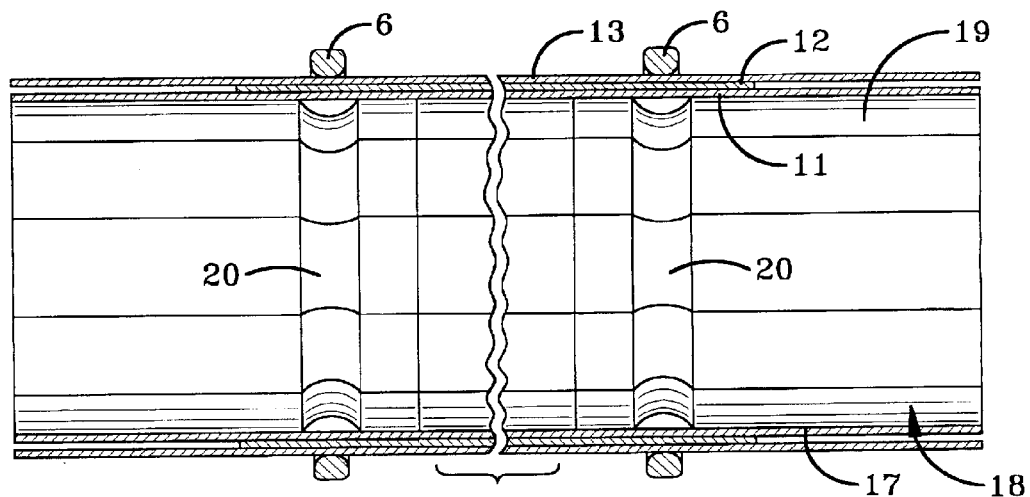
FIG. 6 is a fragmentary diagrammatic sectional view showing the three body ply layers on a tire building drum for forming the tire carcass of FIGS. 4 and 5.
Figure 5:
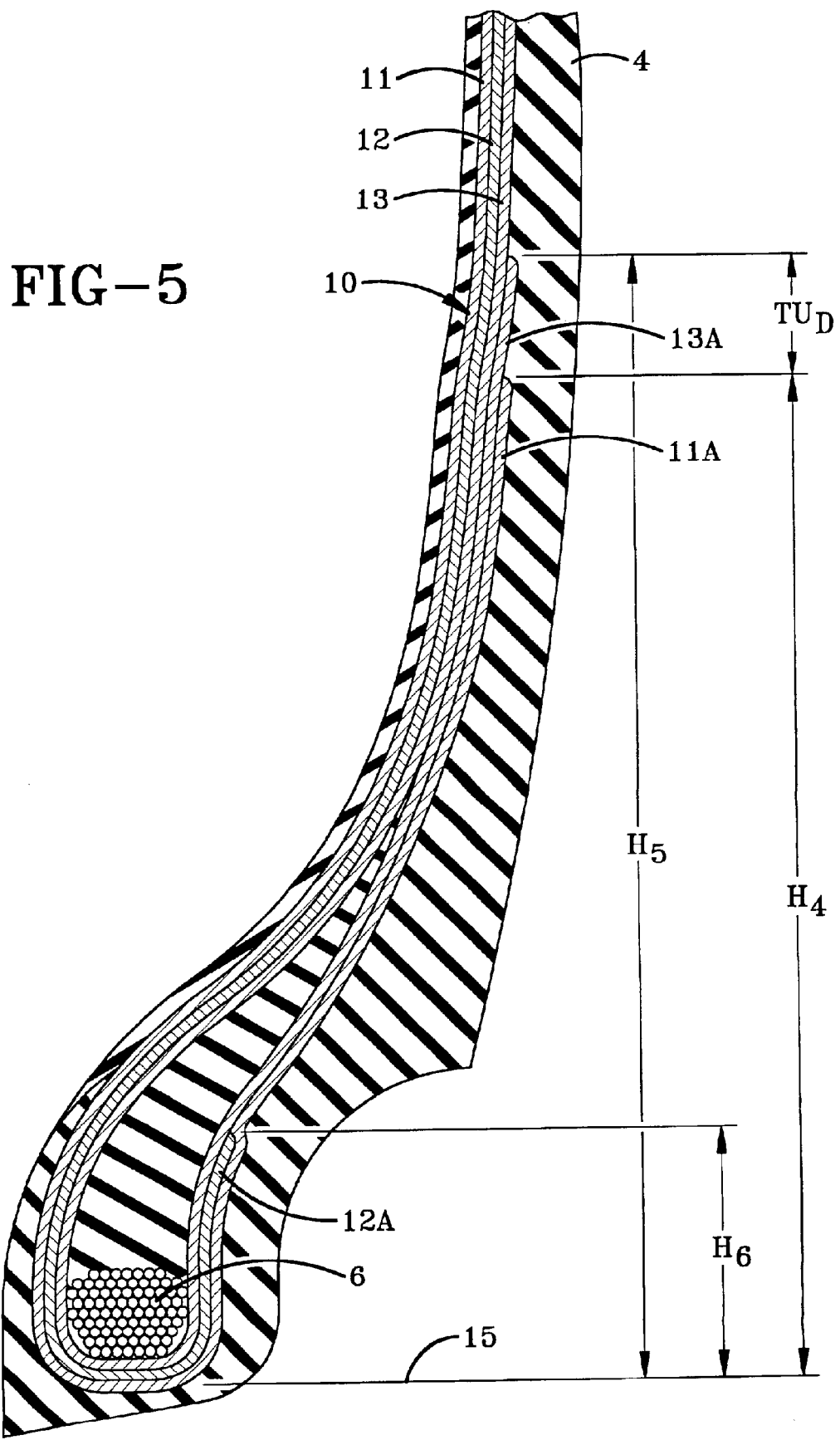
FIG. 5 is a greatly enlarged fragmentary sectional view similar to FIG. 2 showing the three body ply turn-up about the bead area for the carcass as shown in FIG. 4.

A second embodiment of the three ply turn-up is shown in FIGS. 4, 5 and 6 and is referred to as a high-low-high turn-up wherein turn-up ends 11A and 13A will have heights $H_4$ and $H_5$ (FIG. 5) and terminate between 42% and 55% of tire section height H. Turn-up end 12A of body ply layer 12 has a height $H_6$, which again will be 1±⅜ inch, for example ⅝ inch. Again, the difference between turn-up ends 11A and 13A designated by $TU_D$ will be approximately 3/10 inch due to the differences in radii as the two body ply layers extend about bead ring 6. Again, the low body ply layer turn-up end 12A, as shown in FIG. 5, will provide strength to the bead interface with the tire rim, with the high turn-up ends, 11A and 13A, providing for the long term tire durability found to exist due to the turn-up ends terminating in the region set forth above.

FIG. 6 shows diagrammatically the method of building the pneumatic tire construction of FIGS. 4 and 5 wherein body ply layer 11 is first laid on tire building drum surface 17 followed by the placement of body ply layer 12, over which outer body ply layer 13 is laid which when turned-up about the beads 6, provide the turn-up configuration shown in FIGS. 4 and 5 discussed above.

For most tire sizes, the body ply layer or layers for the low turn-up cord will have an axial length of between 75% and 85% of the axial length of the body ply layer or layers providing the high turn-up cord.

Thus the improved pneumatic tire and method of assembly provides for a three body ply layer turn-up, either with a high-low-high configuration or a low-high-low configuration, to provide strength and durability to the tire for normal inflation as well as for low inflation running conditions by terminating at least one of the turn-up ends within a region equal to or less than one-half of the section height of the tire, preferably between 42% and 55% of the tire section height, and by terminating at least one of the turn-up ends adjacent the bead area. Furthermore, the method of manufacturing such tire less expensive by forming the body ply carcass with the inner and outer body ply layers of the same axial length which reduces inventory, storage, transportation, and assembly costs than would be incurred if three different axial length body ply layers were utilized.

While the preferred embodiments of the invention have been described above, the invention is not limited thereto. The claims of the invention follow.

What is claimed is:

1. A pneumatic tire comprising:
   a tread portion;
   a pair of axially spaced bead areas each of which includes an annular bead ring and a bead filler; and
   a pair of side walls which include a body ply carcass having at least three ply layers consisting of an inner layer, an intermediate layer, and an outer layer extending circumferentially about the tire and axially between the bead areas to turn-up around the bead areas from inside to outside and terminate in turn-up end portions, said intermediate layer being different in axial length than said inner and outer layers which are substantially equal in axial length to each other, said said inner, intermediate and outer layers extending axially symmetrically about the bead areas, with the turn-up end portions of said inner and outer layers having substantially equal radial turn-up heights with respect to each other about the pair of bead areas such that the difference in radial height between said inner and outer turn-up end portions is no more than approximately 3/10 of an inch, and the turn-up end portions of said intermediate layer having a different radial turn-up height than said turn-up end portions of said inner and outer layers such that the difference in radial height between said intermediate turn-up end portions and each of said inner and outer turn-up end portions is greater than approximately 3/10 of an inch.

2. The pneumatic tire defined in claim 1 wherein at least one of the turn-up ends has a height of between 42% and 55% of the tire section height (H).

3. The pneumatic tire defined in claim 2 wherein the turn-up end portions of the inner and outer body ply layers have a height of between 42% and 55% of the tire section height (H).

4. The pneumatic tire defined in claim 3 wherein the inner and outer body ply layers have turn-up heights of approximately 45% of the tire section height (H).

5. The pneumatic tire defined in claim 4 wherein the turn-up height of the inner body ply layer is approximately 3/10 inch less than the height of the outer body ply layer turn-up.

6. The pneumatic tire defined in claim 4 wherein the intermediate body ply layer has a turn-up height of approximately 1 inch±3/8 inch.

7. The pneumatic tire defined in claim 6 wherein the intermediate body ply layer turn-up height is approximately 5/8 inch.

8. The pneumatic tire defined in claim 2 wherein the intermediate body ply layer has a turn-up height of between 42% and 55% of the tire section height (H).

9. The pneumatic tire as defined in claim 8 wherein the intermediate body ply layer has a turn-up height of approximately 45% of the tire section height (H).

10. The pneumatic tire as defined in claim 9 wherein the inner body ply layer has a turn-up height of one±3/8 inch; and in which the inner body ply layer has a turn-up height of approximately 3/10 inch less than the turn-up height of the outer body ply layer.

11. The pneumatic tire as defined in claim 1 wherein each of the three body ply layers includes a plurality of textile reinforcing cords extending in an axial direction embedded in an elastomeric material.

12. The pneumatic tire defined in claim 1 wherein the inner and outer body ply layers have axial length between 75% and 85% of the axial length of the intermediate body ply layer.

13. The pneumatic tire as defined in claim 1 wherein the intermediate body ply layer has an axial length between 75% and 85% of the axial length of the inner and outer body ply layers.

14. A method of building a body ply carcass for placement in a pneumatic tire including the steps of:

provinding an expandable building drum having an outer annular surface and a pair of outer bead receiving areas;

wrapping a first body ply layer having a predetermined axial length on the annular surface and over the bead receiving areas;

wrapping a second body ply layer having a predetermined axial length different than the axial length of the first body ply layer about the first body ply layer and over the bead receiving areas;

wrapping a third body ply layer having an axial length approximately equal to the axial length of the first body ply layer about the second body ply layer and over the bead receiving areas;

placing an annular bead over the body ply layers and adjacent to each of the bead receiving areas; and forming the body ply layers into a generally toroidal shape with turn-up ends of the body ply layers extending about the beads from inside to outside such that the difference in radial height between said first and third turn-up ends is no more than approximately 3/10 of an inch and such that the difference in radial height between said second turn-up ends and each of said first and third turn-up ends is greater than approximately 3/10 of an inch.

15. The method defined in claim 14 including the step of forming the first and third body ply layers of equal axial lengths and less than the axial length of the second body ply.

16. The method defined in claim 15 including the step of providing the second body ply layer with an axial length whereby the turn-up end of said second body ply will be between 42% and 55% of the section height of a tire in which the body ply carcass will be placed.

17. The method defined in claim 15 including the step of providing the axial length of the first and third body ply layers whereby the turn-up end of the first body ply layer is approximately 3/10 inch lower than the turn-up end of the third body ply layer.

18. The method defined in claim 14 including the step of forming the first and third body ply layers of equal axial lengths along the drum and greater than the axial length of the second body ply layer.

19. The method defined in claim 18 including the step of providing the first and third body ply layers with equal axial lengths whereby the turn-up ends thereof will be between 42% and 55% of the section height of a tire in which the body ply carcass will be placed.

20. The method defined in claim 14 including the step of forming the body ply layers of textile cords contained in an elastomeric coating with said cords extending in an axial direction.

* * * * *